(12) United States Patent
Hekmatshoartabari et al.

(10) Patent No.: US 10,082,918 B2
(45) Date of Patent: Sep. 25, 2018

(54) IN-CELL CAPACITIVE TOUCH AND FINGERPRINT DETECTOR

(71) Applicant: International Business Machines Corporation, Armonk, NY (US)

(72) Inventors: Bahman Hekmatshoartabari, White Plains, NY (US); Ghavam G. Shahidi, Pound Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 15/346,462

(22) Filed: Nov. 8, 2016

(65) Prior Publication Data

US 2018/0129319 A1    May 10, 2018

(51) Int. Cl.
*G06F 3/044* (2006.01)
*G06K 9/00* (2006.01)

(52) U.S. Cl.
CPC ......... *G06F 3/044* (2013.01); *G06K 9/00013* (2013.01); *G06F 2203/04103* (2013.01)

(58) Field of Classification Search
CPC .......... G06F 3/044; G06F 2203/04103; G06K 9/00013; G09G 3/3258; G09G 3/3233; G09G 2310/08; H01L 29/802; H01L 29/16; H01L 27/3248; H01L 27/3265; H01L 27/1229

See application file for complete search history.

(56) References Cited

U.S. PATENT DOCUMENTS

| | | | | |
|---|---|---|---|---|
| 5,111,255 A | * | 5/1992 | Kiely .................... | B82Y 20/00 257/13 |
| 2006/0050040 A1 | * | 3/2006 | Chou .................. | G09G 3/3233 345/92 |
| 2008/0278410 A1 | * | 11/2008 | Yamashita ........... | G09G 3/3233 345/55 |
| 2011/0169878 A1 | * | 7/2011 | Chung ................. | G09G 3/2014 345/690 |

* cited by examiner

*Primary Examiner* — Liliana Cerullo
(74) *Attorney, Agent, or Firm* — Louis J. Percello, Esq.; Otterstedt, Ellenbogen & Kammer, LLP

(57) ABSTRACT

An apparatus includes multiple pixel circuits for touch and fingerprint detection that may be integrated with a touch-screen. Each pixel circuit includes a JFET with a gate connected to a capacitor plate, where the capacitor plate may be integrated with the gate, and where the capacitor plate is connected via a first diode to a corresponding select line. Furthermore, each JFET in the multiple pixel circuits has a source (or drain) connected to a corresponding read line and a drain (or source) connected via a second diode to a corresponding select line.

20 Claims, 11 Drawing Sheets

IN-CELL CAPACITIVE TOUCH AND FINGERPRINT DETECTOR

BACKGROUND OF THE INVENTION

The present invention relates generally to the electrical, electronic and computer arts, and, more particularly, to capacitive touchscreens.

Capacitive touchscreens are ubiquitous interfaces for interacting with many electronic devices, the smartphone being a common example. To facilitate the entering of commands or the reading of a user's fingerprint, a capacitive touchscreen includes an array of pixel circuits, each pixel circuit sensing via capacitive coupling the proximal presence of a user, such as for example the user's finger or thumb. For some types of capacitive touchscreens, each pixel circuit comprises a capacitor plate, where the proximal presence of a user forms the complementary capacitor plate, thereby loading the pixel circuit with what is termed a touch capacitance. (The terms "capacitance" and "capacitor" are at times used interchangeably, it being understood that capacitance is an attribute of a capacitor.) A pixel circuit is also loaded by parasitic capacitance, but in practice the parasitic capacitance should be small compared to the touch capacitance.

To form a map (image) of the pixel circuit locations on a touchscreen that are loaded by a touch capacitance, for example for the detection of a fingerprint, a charge operation is performed on each pixel circuit followed by a read operation to determine those pixel circuits that are loaded by a touch capacitance. The pixel circuits are discharged (i.e., the effective parasitic and touch capacitors are discharged), and the process begins again to form another map of the touch capacitance locations. The time for performing the cycle of charge, read, and discharge operations can be referred to as the frame time. It is desirable for the frame time to be relatively small in value so that touch capacitance locations are accurately determined. It is also desirable to reduce power consumption by operating the touchscreen at a relatively small operating voltage, so that relatively small charges are involved in charging and discharging the touch capacitance.

BRIEF SUMMARY

Principles of the invention, in accordance with one or more embodiments thereof, provide for in-cell capacitive touch and fingerprint detection, suitable for implementation in a capacitive touchscreen.

In one aspect, an embodiment includes a first select line, a second select line, a read line, and a pixel circuit. The pixel circuit includes a capacitor plate and a JFET (Junction Field Effect Transistor), where the JFET comprises a first terminal coupled to the read line, a gate connected to the capacitor plate, and a second terminal coupled to the second select line. The pixel circuit further includes a first diode having a first terminal connected to the capacitor plate and a second terminal connected to the first select line.

In another aspect, an embodiment includes a first select line, a second select line, a third select line, a plurality of read lines, and a first row of pixel circuits in one-to-one correspondence with the plurality of read lines. Each pixel circuit in the first row of pixel circuits includes: a capacitor plate; a JFET comprising a gate connected to the capacitor plate, a first terminal coupled to a corresponding read line, and a second terminal coupled to the second select line; and a first diode comprising a first terminal connected to the capacitor plate and a second terminal connected to the first select line. The embodiment further includes a second row of pixel circuits in one-to-one correspondence with the plurality of read lines. Each pixel circuit in the second row of pixel circuits includes: a capacitor plate; a JFET comprising a gate connected to the capacitor plate, a first terminal coupled to a corresponding read line, and a second terminal coupled to the third select line; and a first diode comprising a first terminal connected to the capacitor plate and a second terminal connected to the second select line.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. By way of example only and without limitation, one or more embodiments may provide one or more of the following advantages: relatively low voltage operation of a capacitive touchscreen, where some embodiments may operate at approximately 1.0V; and relatively fast frame rate, where some embodiments may have a frame time of approximately 16 ms for a QVGA (Quarter Video Graphics Array).

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of the present invention will be described herein in the context of a capacitive touchscreen, but are not limited to capacitive touchscreens.

Figure 1:
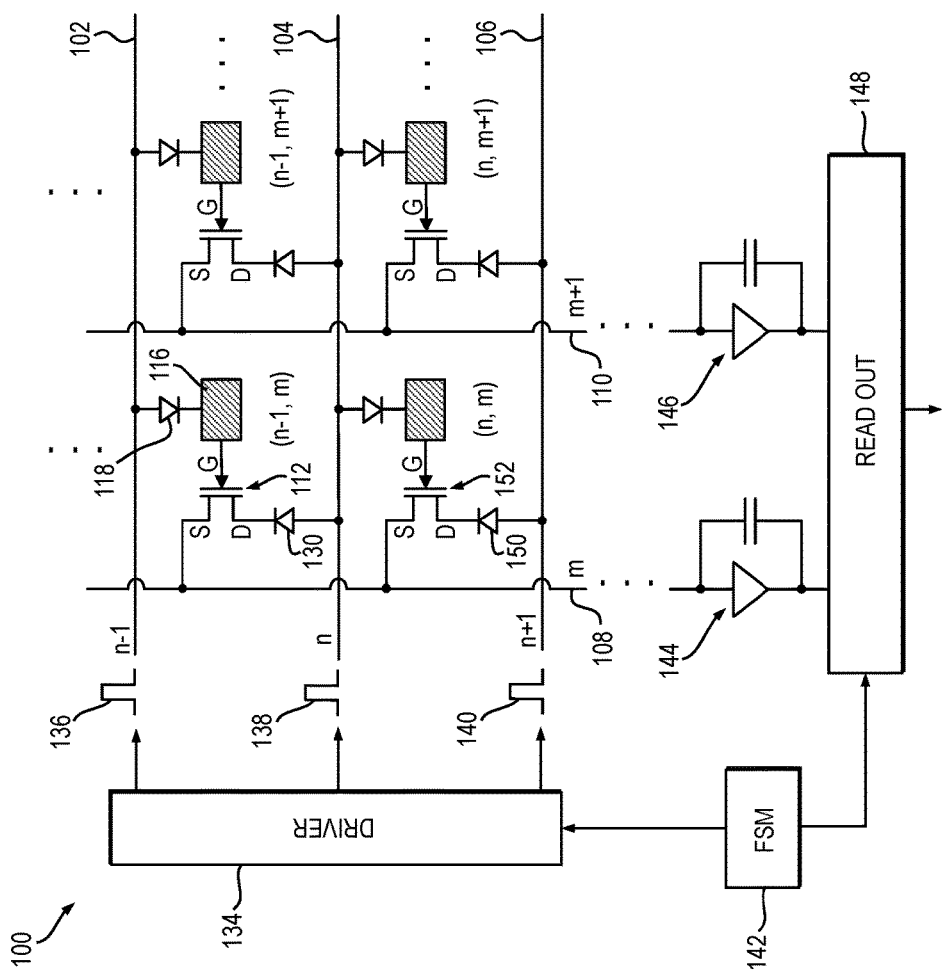
FIG. 1 is a circuit-level illustration of an embodiment that may find application in a capacitive touchscreen.

FIG. 1 is a schematic diagram depicting an illustrative circuit 100 that may find application in a capacitive touchscreen, according to an embodiment of the invention. A typical circuit embodiment may include a relatively large number of pixel circuits for detecting those locations of the capacitive touchscreen for which a user is applying a finger or thumb so as to provide a fingerprint, or swiping or touching with his or her finger or thumb to respond to a prompt or to enter a command. For ease of description, FIG. 1 illustrates only four pixel circuits, labeled (n−1, m), (n−1, m+1), (n, m), and (n, m+1). Here, the label (i, j) for a given pixel circuit indicates that the pixel circuit is connected to the $i^{th}$ select line and the $j^{th}$ read line, with i and j being integers, where a select line associated with a pixel circuit selects the pixel circuit to be charged and a read line associated with the pixel circuit provides a signal indicative of the charge stored by a capacitor loading the pixel circuit.

The circuit 100 includes a first select line 102, labeled as n−1, which selects the pixel circuits (n−1, m) and (n−1, m+1) for charging, and a second select line 104, labeled as n, which selects the pixel circuits (n, m) and (m+1) for charging. Additional select lines, such as a third select line 106, labeled as n+1, may be used to select other corresponding pixel circuits for charging. The circuit 100 further includes a first read line 108, labeled as m, which propagates signals from corresponding pixel circuits (n−1, m) and (n, m) during a read operation, and a second read line 110, labeled as m+1, which propagates signals from pixel circuits (n−1, m+1) and (n, m+1) during the read operation. As will be described in more detail below, a select line may be adapted to serve multiple purposes; for example, a select line is also used, in one or more embodiments, to select a pixel circuit for reading a charge stored by the pixel circuit (the charge stored by the corresponding touch capacitor). For example, in one or more embodiments, the select line 104 is used during a read operation of the pixel circuits (n−1, m) and (n−1, m+1), and the select line 106 is used during a read operation of the pixel circuits (n, m) and (n, m+1).

In one or more embodiments, a pixel circuit comprises several components. For example, the pixel circuit (n−1, m) comprises a JFET 112 having a gate (G) connected to a first plate 116 of a corresponding capacitor. The capacitor plate 116 is connected to a first diode 118, where an anode 120 of the diode 118 is connected to the select line 102 and a cathode 122 of the diode 118 is connected to the capacitor plate 116. A source (S) of the JFET 112 is connected to the read line 108, and a drain (D) of the JFET 112 is connected to a cathode of a second diode 130. An anode of the diode 130 is connected to the select line 104.

It is to be appreciated that because a metal-oxide-semiconductor (MOS) device is symmetrical in nature, and thus bi-directional, the assignment of source and drain designations in the MOS device is essentially arbitrary. Therefore, the source and drain of a given MOS device may be referred to herein generally as first and second source/drain, respectively, where "source/drain" in this context denotes a source or a drain.

The capacitor plate 116 is illustrated and described as a component distinct from the gate of the JFET 112, in one or more embodiments. This distinction is made for ease of discussion and illustration; for other embodiments, however, the capacitor plate 116 may be integrated with the gate or implemented as an extension of the gate. The capacitor plate is preferably comprised of a transparent conductive material such as indium-tin-oxide; however, other conductive materials such as metals may be used as well. The capacitor plate 116 may also be referred to as a capacitor electrode or terminal.

The capacitor of which the capacitor plate 116 comprises one of the capacitor plates may be viewed as comprising the capacitor plate 116 and a complementary capacitor plate due to parasitic capacitance present in the device in which the circuit 100 is incorporated, as well the surrounding environment, including the user of the device, such as for example the user's finger, thumb, hand, etc., provided that a portion (e.g., finger, hand, etc.) of the user is proximal to the capacitor plate 116. In a typical device, a glass surface, and perhaps other layers, cover the capacitor plate 116, so that that portion of a user's finger or hand near or on the glass proximal to the capacitor plate 116 provides capacitive coupling to ground so as to affect the capacitance loading the gate of the JFET 112. This capacitance may be referred to as touch capacitance and represented by the symbol $C_T$, where parasitic capacitance (that part of the total capacitance not due to a user) is sometimes represented by the symbol $C_0$. (The symbols $C_T$ and $C_0$ may also represent the respective capacitors themselves.) In practice, it is assumed that the touch capacitance is sufficiently larger than the parasitic capacitance so that the various pixel circuits in the circuit 100 allow for the detection of a user's finger, thumb, hand, etc., and the fingerprint thereof.

A driver circuit 134 provides a sequence of pulses 136, 138, and 140 to the select lines 102, 104, and 106, respectively, to charge and allow read operations on the various pixel circuits. A finite state machine (FSM) 142 controls the driver circuit 134 so that the pulses 136, 138, 140 are provided to the select lines 102, 104, 106 at appropriate times as described in more detail below. During a read operation, charge integrators 144, 146 included in the circuit 100 are configured to integrate current propagated by the read lines 108 and 110, respectively. The charge integrators 144, 146 provide their respective output signals to a readout circuit 148. The readout circuit 148 provides output signals indicative of the capacitance loading the corresponding pixel circuits. For example, the output signals from the charge integrators 144, 146 may be sampled at prescribed times and compared to a threshold value to determine whether the capacitance loading associated with a particular pixel circuit represents a parasitic capacitance $C_0$ or a touch capacitance $C_T$. In the particular embodiment of FIG. 1, the finite state machine 142 controls the readout circuit 148 to provide timed sampling of the output signals from the charge integrators 144, 146.

A programmable processor (not explicitly shown, but implied) under control of software and/or firmware may implement one or more functions of the finite state machine 142, where, for example, the programmable processor may be an application processor of a consumer device such as a smartphone. For some embodiments, a programmable logic array or an application specific integrated circuit (ASIC) may implement one or more functions of the finite state machine 142.

Figure 2:
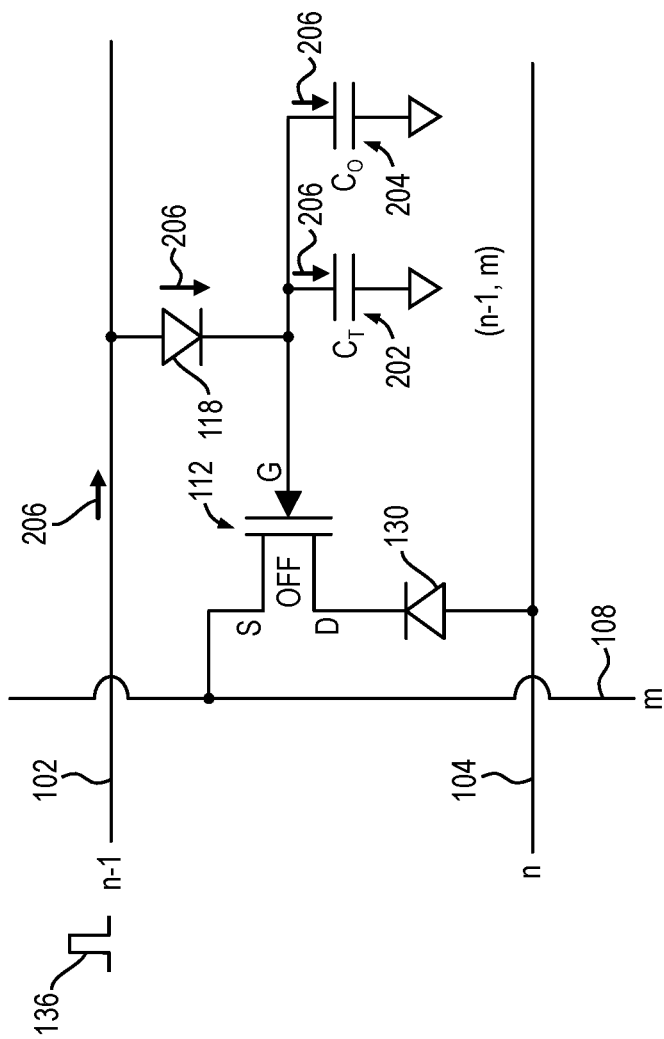
FIG. 2 illustrates a charge operation for the embodiment of FIG. 1.

FIG. 2 conceptually illustrates an exemplary charge operation performed on the pixel circuit (n−1, m) of the circuit 100, according to an embodiment of the invention. With reference to FIG. 2, the finite state machine 142 causes the driver circuit 134 to drive the select line 102 with the pulse 136 so as to charge the effective capacitance loading the gate of the JFET 112. In this embodiment, a touch capacitor 202 and a parasitic capacitor 204 represent the effective capacitance loading the gate. The capacitance of the gate of the JFET 112 may be viewed as part of the parasitic capacitor 204. During the charge operation on the pixel circuit (n−1, m), the driver circuit 134 has not yet driven the select line 104 with the pulse 138 (see FIG. 1), so that the JFET 112 is switched off. Arrows 206 illustrate current flow in the pixel circuit (n−1, m) of FIG. 2, where the diode 118 is in a conductive state so that the capacitors 202 and 204 accumulate charge. In this scenario, the diode 130 is in a non-conductive state.

Figure 3:
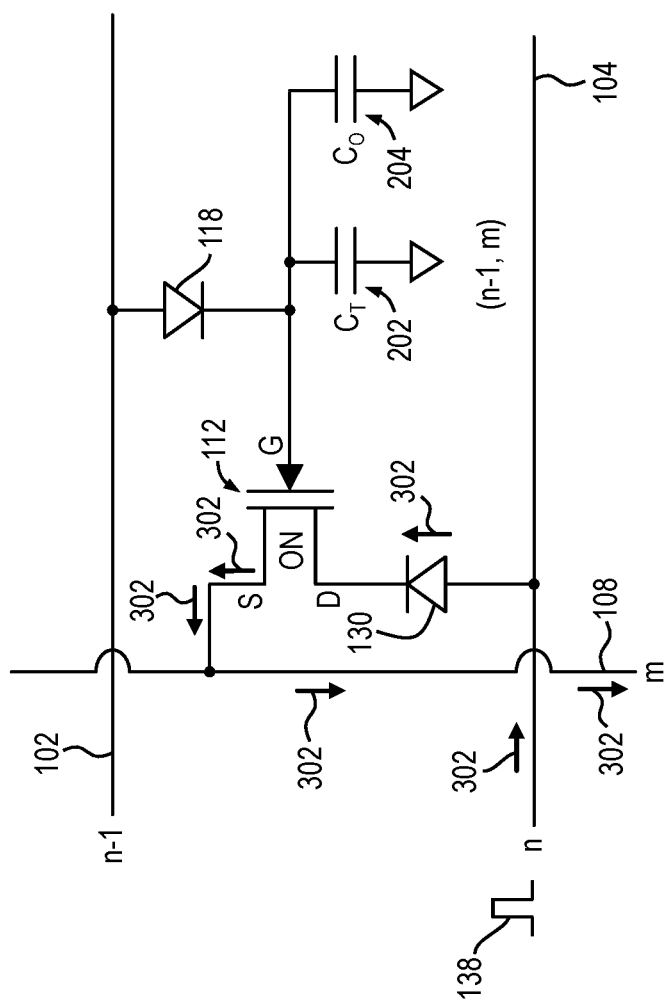
FIG. 3 illustrates a read operation for the embodiment of FIG. 1.

FIG. 3 conceptually illustrates an exemplary read operation performed on the pixel circuit (n−1, m) of the circuit 100, according to an embodiment of the invention. As shown in FIG. 3, the finite state machine 142 causes the driver circuit 134 to drive the select line 104 with the pulse 138. The diode 130 is in a conductive state, and assuming that the effective capacitor loading the gate of the JFET 112 has sufficient capacitance, such as when a user places a finger proximal to the pixel circuit (n−1, m), the effective capacitor is at a sufficient voltage to switch on the JFET 112. As a result, current flows through the diode 130 and the JFET 112 into the read line 108 to be sensed by the charge integrator 144 (see FIG. 1), as indicated by arrows 302.

As illustrated in FIG. 3, during the read operation upon the pixel circuit (n−1, m), the driver circuit 134 is not driving the select line 102, and consequently the diode 118 is in a non-conductive state. In this way, the effective capacitor loading the gate is not discharged during a read operation and is isolated from other pixel circuits.

In light of the above description, it is seen that driving a select line with a pulse performs two operations simultaneously: a charge operation upon one row of pixel circuits, and a read operation upon another row of pixel circuits. As used herein, the term "row" is intended to refer broadly to a plurality of pixel circuits, and does not necessarily imply that the pixel circuits in a given "row" are required to be fabricated in the same line; that is, a "row" does not necessarily refer to the physical layout of the circuits. The row of pixel circuits being charged comprises those pixel circuits with a corresponding effective capacitance coupled to the driven select line via a diode. The row of pixel circuits being read comprises those pixel circuits for which their corresponding JFET has its drain coupled to the driven select line via a diode. Thus, using the illustrative notation shown in FIG. 1, driving the select line labeled n (select line 104) performs a charge operation on pixel circuits having a storage capacitor operatively coupled (via a first diode) to the select line 104—(n, 1), (n, 2), . . . , (n, M), where M denotes the number of pixel circuits in a given row—and simultaneously performs a read operation on pixel circuits having a JFET operatively coupled (via a second diode) to the select line 104—(n−1, 1), (n−1, 2), . . . , (n−1, M). Consequently, the finite state machine 142 causes the driver circuit 134 to drive each select line with a pulse, one select line at a time, where during each pulse a read operation is performed on one row of pixel circuits and a charge operation is performed on another row of pixel circuits.

The diodes illustrated in FIG. 1 properly isolate the pixel circuits so that charge and read operations are performed on intended pixel circuits without affecting unintended pixel circuits. For example, referring again to FIG. 1, when the select line n (104) is driven with a pulse 138, the pixel circuit (n−1, m) is being read and the pixel circuit (n, m) is being charged (i.e., its corresponding capacitor is being charged), but with the diode 150 in the pixel circuit (n, m) in a non-conductive state, the current provided by the pixel circuit (n−1, m) does not flow through JFET 152 in the pixel circuit (n, m). Otherwise, current flowing through the JFET 152 would flow into the select line labeled n+1 (select line 106), which would charge other pixel circuits, which in the notation of FIG. 1 would be (if illustrated) pixel circuits (n+1, 1), . . . , (n+1, M). This would result in erroneous circuit operation.

To reduce power consumption and to speed up charge and read operations, it is desirable, in one or more embodiments, for a JFET in a given pixel circuit, e.g., the JFET 112 in the pixel circuit (n−1, m), to have a relatively small threshold voltage so that the select lines may be driven at a relatively small voltage when compared to conventional touchscreens. FIG. 4 illustrates a cross-sectional slice of an exemplary n-channel JFET that exhibits relatively low threshold voltage (e.g., less than about 0.5 V), according to an embodiment of the invention.

Figure 4A:
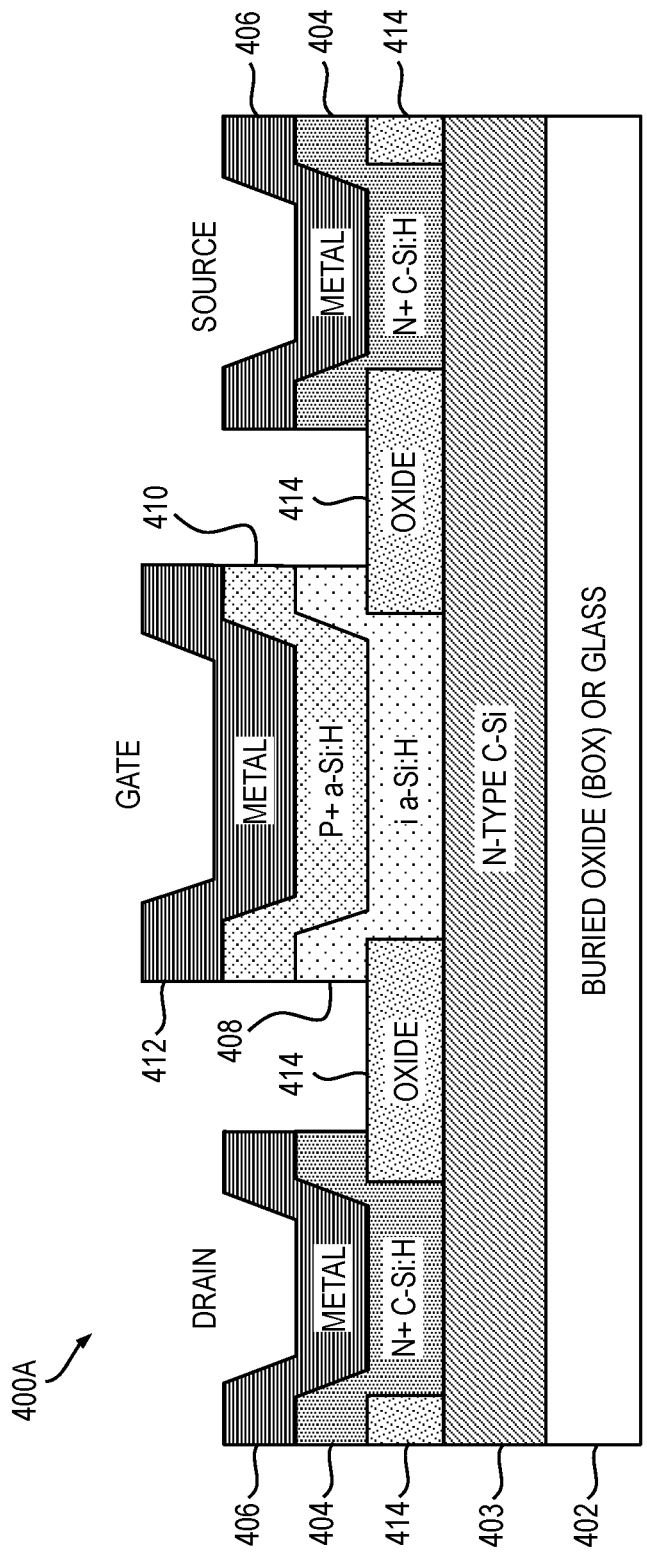
FIG. 4A illustrates a cross-sectional slice of an n-channel JFET according to the embodiment of FIG. 1.

FIG. 4A is a cross-sectional view depicting an exemplary JFET 400A having a low threshold voltage that may be well-suited for use in the circuit of FIG. 1, according to an embodiment of the invention. Referring now to FIG. 4A, beginning with a substrate 402, which may be comprised of buried oxide (BOX) or glass, a layer 403 comprising n-doped crystalline silicon is formed on the substrate 402. The crystalline silicon layer 403 may be comprised of single-crystalline or poly-crystalline silicon. In one example, the crystalline silicon layer 403 is comprised of low-temperature poly-silicon (LTPS) prepared by excimer laser annealing (ELA). In one example, the layer 403 is comprised of LTPS having a thickness in the range of 20 nm to 55 nm and a doping concentration in the range of $3\times10^{18}$ $cm^{-3}$ to $8\times10^{16}$ $cm^{-3}$. In one or more embodiments, the layer 403 may have a thickness of about 32 nm and an n-doping concentration of about $3\times10^{17}$ $cm^{-3}$, although it is to be appreciated that embodiments of the invention are not limited to a specific doping type or concentration.

A drain and a source of the JFET 400A are each formed on the layer 403, with each of the drain and source, in this embodiment, comprising an $n^+$-doped hydrogenated silicon layer 404, upon which is formed a conductive layer 406, which may be a metal layer, so as to provide an ohmic contact with the respective drain or source. In this embodiment, the n⁺-doped hydrogenated silicon layer 404 is grown epitaxially; therefore, a portion of the layer 404 grown on the crystalline silicon layer 403 is crystalline in structure and a portion grown on an oxide layer 414 is non-crystalline. A gate of the JFET 400A is formed on the layer 403 and includes an intrinsic amorphous hydrogenated silicon layer 408 upon which is formed a p⁺-doped amorphous hydrogenated silicon layer 410 and a conductive (e.g., metal) layer 412 formed on the layer 410.

In an embodiment, the layer 410 may have a doping concentration in a range of about $10^{16}$ cm⁻³ to $10^{21}$ cm⁻³ and a thickness in a range of about 5 nm to 15 nm. The intrinsic amorphous hydrogenated silicon layer 408 may have a thickness in a range of about 2 nm to 100 nm. The hydrogenated silicon layers may comprise about 5 atomic % hydrogen to 40 atomic % hydrogen. The JFET 400A includes other layers, but for ease of description not all passivation and/or isolation layers are shown. The width of a JFET according to an embodiment may be about 5 microns (μm), where the length is about 2 μm. It is to be understood, however, that embodiments of the invention are not limited to any specific dimensions.

Figure 4B:
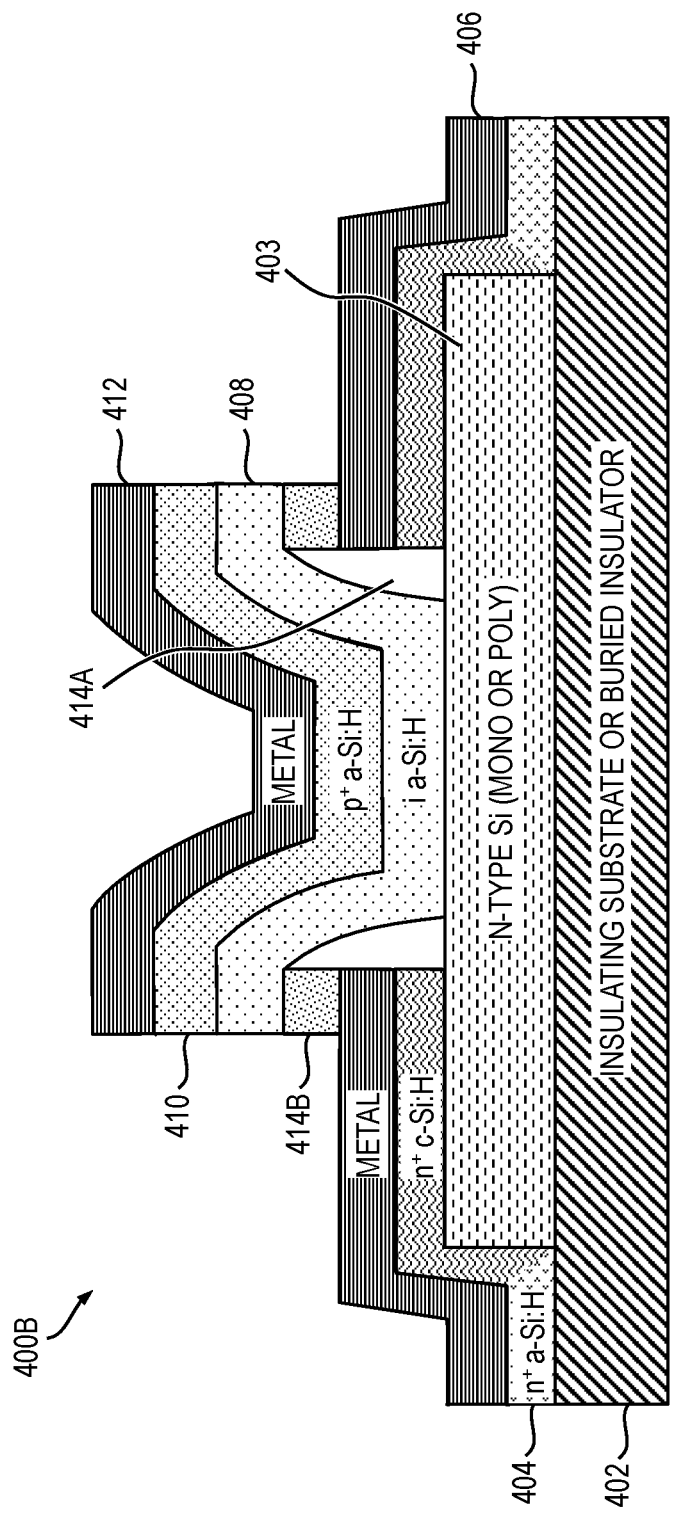
FIG. 4B illustrates a cross-sectional slice of another example of an n-channel JFET according to the embodiment of FIG. 1.

FIG. 4B is a cross-sectional view depicting another exemplary JFET 400B having a low threshold voltage that also may be well-suited for use in the circuit of FIG. 1, according to an embodiment of the invention, where various numerals appearing in FIG. 4A have been used. The layer 404 in FIG. 4B comprises hydrogenated silicon that is crystalline on the surface (and sidewalls) of the layer 403, but amorphous elsewhere. The gate (i.e., the stack comprising the layers 408, 410, and 412) is separated from the source or drain with a spacer 414A in the horizontal direction (the substrate layer 402 taken as "horizontal") and with a layer 414B in the vertical direction. The layers 414A and 414B are comprised of insulating materials, such as, for example, an oxide. The spacer 414A may be formed using conventional techniques, e.g., conformal deposition of an insulator followed by anisotropic etching.

Figure 4C:
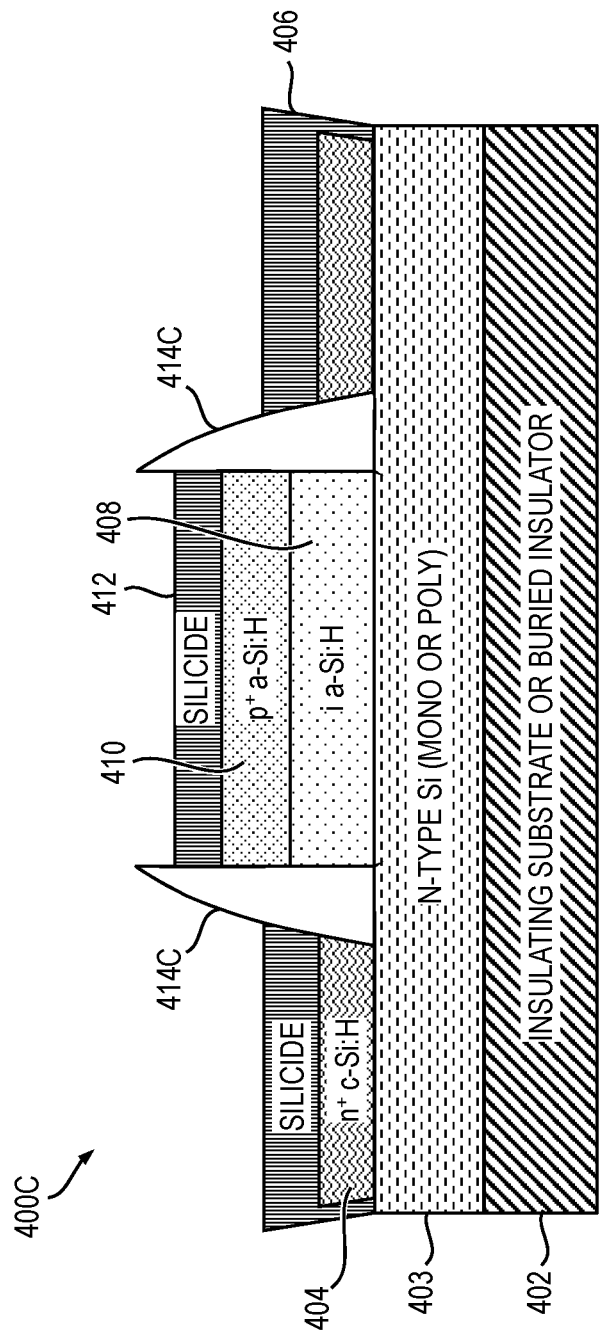
FIG. 4C illustrates a cross-sectional slice of another example of an n-channel JFET according to the embodiment of FIG. 1.

FIG. 4C is a cross-sectional view depicting another exemplary JFET 400C having a low threshold voltage that also may be well-suited for use in the circuit of FIG. 1, according to an embodiment of the invention, where again various numerals appearing in FIG. 4A have been used. In FIG. 4C, a spacer 414C is essentially the same as the spacer 414A in FIG. 4B. The layer 404 can be grown using the same method as for the embodiments illustrated in FIG. 4A and FIG. 4B, but the amorphous portion of the layer is etched selectively, e.g. in-situ, using a hydrogen plasma, leaving only the crystalline portion. Silicide (the conductive layer 412 on the gate stack) is formed using conventional techniques, e.g., metal deposition followed by annealing to form silicide as a result of chemical reaction between metal and a Si containing layer (e.g., hydrogenated crystalline Si and hydrogenated amorphous Si) followed by wet etching of the unreacted portion (i.e., that portion in which silicide is not formed) of the metal.

Figure 8:
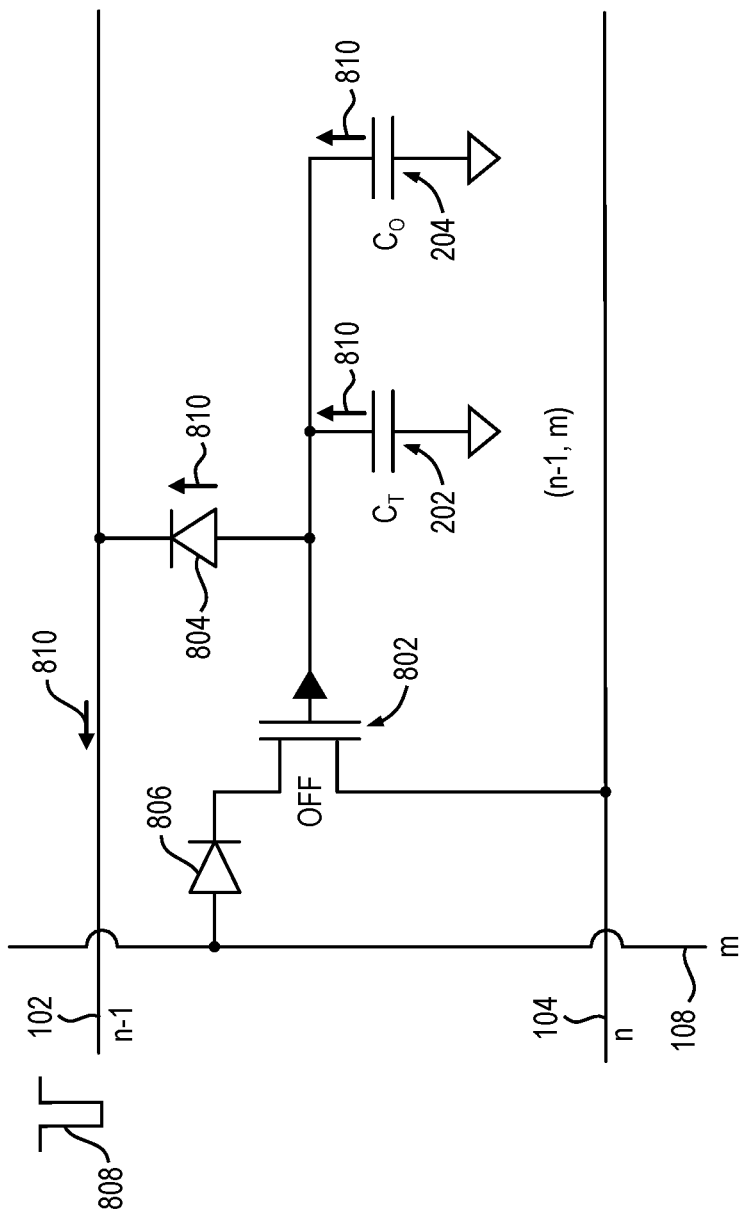
FIG. 8 illustrates a charge operation for an embodiment similar to that of FIG. 1 but for a p-channel JFET.
Figure 9:
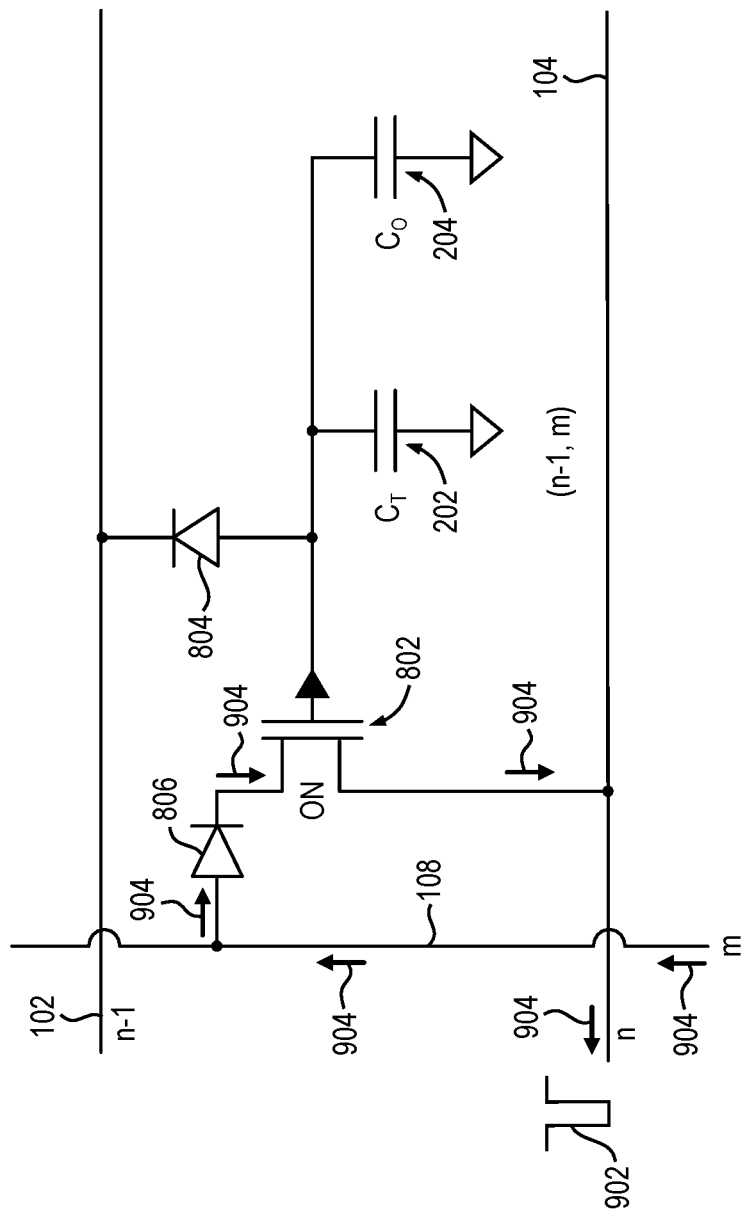
FIG. 9 illustrates a read operation for an embodiment similar to that of FIG. 1 but for a p-channel JFET.

FIGS. 4A, 4B, and 4C each illustrate an n-channel JFET, but other embodiments may employ a p-channel JFET in place of an n-channel JFET. For such embodiments, in relation to the above description regarding an n-channel JFET, p-doped regions replace n-doped regions. Furthermore, FIGS. 8 and 9 describe a pixel circuit embodiment for a p-channel JFET rather than the descriptions and circuits corresponding to the embodiments of FIGS. 2 and 3. Referring to FIG. 8, for a p-channel JFET 802, a diode 804 has an anode connected to the capacitors 202 and 204 and a cathode connected to the select line 102, and a diode 806 has an anode connected to the read line 108 and a cathode connected to the source of the p-channel JFET 802. For a charge operation, a negative pulse 808 is provided to the select line 102, where the arrows 810 represent current flow. Referring to FIG. 9 for a read operation, a negative pulse 902 is provided to the select line 104, where the arrows 904 represent current flow. Accordingly, for such embodiments with a p-channel JFET, the readout circuit 148 is configured to indicate that a pixel circuit is loaded by a touch capacitance when the corresponding read line is not sinking current.

In the above description, the source and drain for an n-channel or p-channel JFET are structurally similar to each other, so that the definition of whether a terminal is a source or drain depends upon the circuit configuration. Accordingly, a source or drain may be referred to as a terminal, or for example as a first terminal or second terminal, or as a source/drain, as previously explained.

By the end of a frame time, each pixel circuit is at least partially discharged (i.e., the corresponding touch capacitors $C_T$ are at least partially discharged) before the next frame time begins due to leakage current through the gate stack of each corresponding JFET. For some embodiments, fully discharging the capacitors may take multiple frame times, whereas for some embodiments each touch capacitor is essentially discharged by the end of a frame time.

Figure 5:
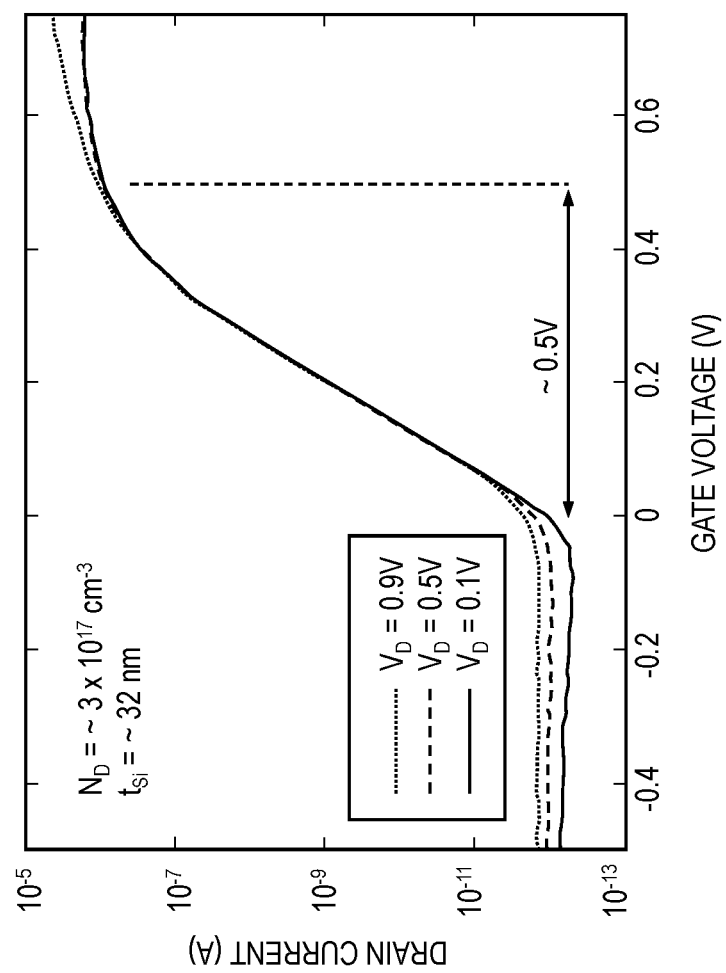
FIG. 5 illustrates a typical transfer characteristic curve for a JFET according to the embodiment of FIG. 4.

FIG. 5 is a graph illustrating an exemplary transfer characteristic curve of drain current to gate-to-source voltage for an n-channel JFET according to an embodiment for three values of drain-to-source voltage $V_D$: 0.1 V, 0.5 V, and 0.9 V. As seen from the curves, the threshold voltage in the example of FIG. 5 is approximately 0.5 V. Accordingly, taking 0.5 volt (V) as the threshold voltage, for an embodiment the driver circuit 134 drives the select lines with pulses having a voltage of about $V_{DIODE}$+0.5 V, where $V_{DIODE}$ denotes the forward voltage drop of the diodes in a pixel circuit. For some embodiments, one or both diodes in the pixel circuit may be realized by a diode-connected JFET. For example, in the pixel circuit (n−1, m), the diodes 118 and 130 may each be a diode-connected JFET with a structure similar to that of the JFET 112. A diode-connected JFET may be realized by using the gate electrode (terminal) of the JFET as the first electrode of the diode (anode, if the JFET is n-channel, cathode if the JFET is p-channel) and using either or both the drain and source electrodes (terminals) of the JFET as the second electrode of the diode. If both drain and source electrodes are used, they may be connected to each other to form a single electrode. If a magnitude of the forward voltage drop of such a diode-connected JFET is about 0.5 V, then the select lines should be driven to about 1.0 V. This represents a significant improvement over some conventional capacitive touchscreens operating in the range of about 8 V to 10 V.

For a handheld device, where the components making up a pixel circuit according to an embodiment occupy about 10% of the pixel circuit area, it is expected that the touch capacitance is approximately 50 femtofarad (fF). This is sufficiently greater in value than the gate capacitance of a typical JFET according to an embodiment, which for an illustrative width-to-length ratio of about 5 μm/2 μm is approximately 1 fF to 2.5 fF for a gate-to-source voltage in the range of 0 V to 0.5 V. For a leakage current of about 2 picoamperes (pA) in a pixel circuit, approximately 98% of the charge is retained on the touch capacitor $C_T$ during a row time of about 64 microseconds (μs). The touch capacitor $C_T$ for a pixel circuit is essentially fully discharged during a frame time of approximately 16 milliseconds (ms) for a QVGA (quarter video graphics array).

Figure 6:
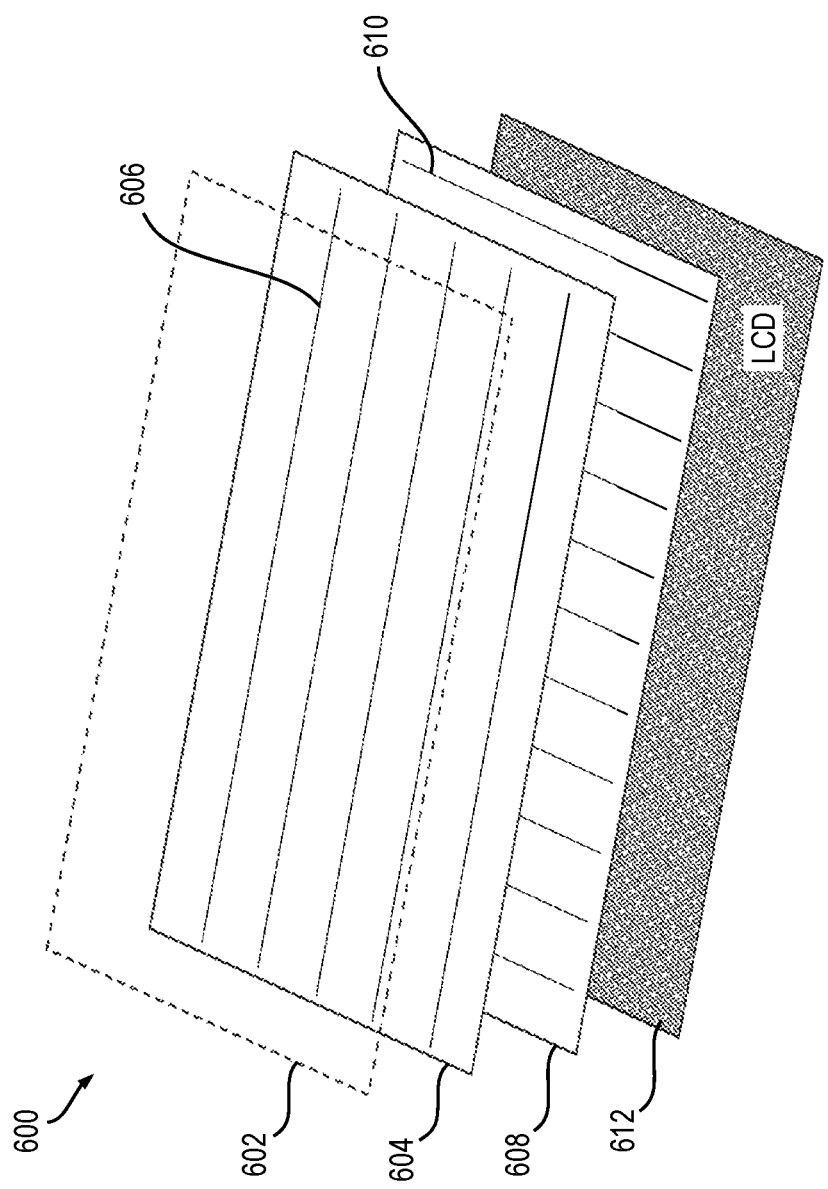
FIG. 6 illustrates a portion of a capacitive touchscreen with the embodiment of FIG. 1 utilized with an LCD.

Embodiments of the invention may find wide applications to touchscreens in an LCD (liquid crystal display) or an OLED (organic light emitting diode) display. FIG. 6 illustrates at least a portion of an exemplary capacitive touchscreen 600 suitable for use with an LCD application, according to an embodiment of the invention. The capacitive touchscreen 600 includes a topmost layer 602, which in one or more embodiments comprises a glass layer, on which a user may apply a finger or thumb to provide a fingerprint, or may touch or swipe with a finger or thumb to respond to a prompt or to enter a command. The glass layer 602 serves as part of the dielectric for the touch capacitor. Below the glass layer 602 is a layer 604 comprising a plurality of select lines 606. Below the layer 604 is a layer 608 comprising a plurality of read lines 610. There may be other components and other layers included in the capacitive touchscreen 600 for implementing the circuits as previously discussed, but for ease of illustration only the select lines and the read lines are shown (in simplified fashion) in FIG. 6. The layer 608 is formed on at least a portion of an upper surface of an LCD panel 612.

Figure 7:
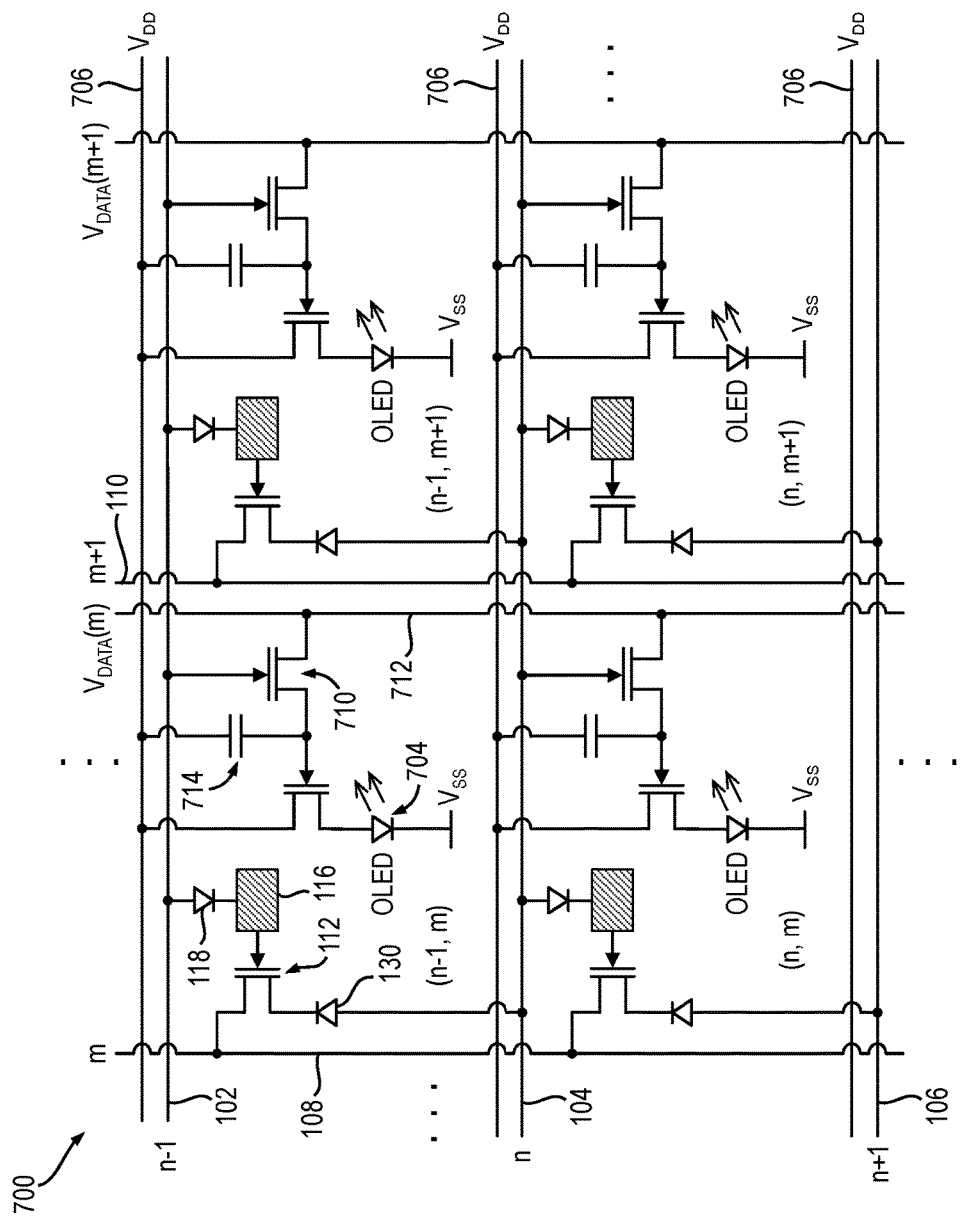
FIG. 7 illustrates the embodiment of FIG. 1 integrated with an active matrix OLED display.

FIG. 7 is a schematic diagram depicting an exemplary circuit 700 in which at least a portion of a capacitive touchscreen circuit according to aspects of the invention is integrated with an active matrix OLED display. The capacitive touchscreen circuit is preferably implemented in a manner consistent with the exemplary circuit 100 shown in FIG. 1. Referring to the pixel circuit (n–1, m) illustrated in FIG. 7, in addition to the pixel circuit components shown in FIG. 1, the pixel circuit (n–1, m) includes a second JFET 702. The JFET 702 is configured such that when switched on, current is provided to an OLED 704 by coupling an anode of the OLED 704 to a voltage supply rail 706 and a cathode of the OLED 704 to a voltage return, which may be ground or $V_{SS}$. A gate of the JFET 702 is coupled to a source (or drain) of a third JFET 710, and a drain (or source) of the JFET 710 is connected to a corresponding data line 712. (The JFET 710 is a path transistor and therefore the designation of the functional source and drain may vary depending on the value of voltage $V_{data}(m)$ on the data line 712). A gate of the JFET 710 is connected to the corresponding select line 102. A capacitor 714 maintains the desired charge on the gate of the JFET 702 during a prescribed frame time. The same process technology may be utilized for the JFETs 702 and 710 as for the JFET 112. It is noted that the select line 102 is shared by the circuit components discussed previously for charging and reading the touch capacitor and the circuit components for selecting which OLED to switch on (depending upon the data line coupled to that OLED).

Although the overall fabrication method and the structures for the disclosed embodiments are entirely novel, certain individual processing steps required to implement the method may utilize conventional semiconductor fabrication techniques and conventional semiconductor fabrication tooling. These techniques and tooling will already be familiar to one having ordinary skill in the relevant arts given the teachings herein. Moreover, many of the processing steps and tooling used to fabricate semiconductor devices are also described in a number of readily available publications, including, for example: James D. Plummer et al., *Silicon VLSI Technology*, Prentice Hall; 2 edition (Nov. 11, 2008); and James D. Plummer et al., *Silicon VLSI Technology: Fundamentals, Practice, and Modeling*, Pearson; 1 edition (Jul. 24, 2000), which are both hereby incorporated by reference herein. It is emphasized that while some individual processing steps are set forth herein, those steps are merely illustrative, and one skilled in the art may be familiar with several equally suitable alternatives that would also fall within the scope of the invention.

It is to be appreciated that the various layers and/or regions shown in the accompanying figures may not be drawn to scale. Furthermore, one or more semiconductor layers of a type commonly used in such integrated circuit devices may not be explicitly shown in a given figure for ease of explanation. This does not imply that the semiconductor layer(s) not explicitly shown are omitted in the actual integrated circuit device.

At least a portion of the techniques of the present invention may be implemented in an integrated circuit. In forming integrated circuits, identical die are typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Any of the exemplary circuits illustrated in the accompanying figures, or portions thereof, may be part of an integrated circuit. Integrated circuits so manufactured are considered part of this invention.

Those skilled in the art will appreciate that the exemplary structures discussed above can be distributed in raw form (i.e., a single wafer having multiple unpackaged chips), as bare dies, in packaged form, or incorporated as parts of intermediate products or end products that benefit from having sensor devices therein formed in accordance with one or more embodiments of the invention.

The illustrations of embodiments of the invention described herein are intended to provide a general understanding of the various embodiments, and they are not intended to serve as a complete description of all the elements and features of apparatus and systems that might make use of the circuits and techniques described herein. Many other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the invention are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Terms such as "above" and "below" are used to indicate relative positioning of elements or structures to each other as opposed to relative elevation.

The corresponding structures, materials, acts, and equivalents of all means or step-plus-function elements in the claims below are intended to include any structure, material, or act for performing the function in combination with other claimed elements as specifically claimed. The description of the various embodiments has been presented for purposes of illustration and description, but is not intended to be exhaustive or limited to the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the various embodiments with various modifications as are suited to the particular use contemplated.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

Given the teachings of embodiments of the invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. An apparatus, comprising:
    at least first and second select lines;
    a read line; and
    a pixel circuit, the pixel circuit comprising:
        a capacitor plate;
        a junction field effect transistor (JFET) including a first terminal coupled to the read line, a second terminal coupled to the second select line, and a gate connected directly to the capacitor plate; and
        a first diode having a first terminal connected directly to the capacitor plate and a second terminal coupled to the first select line.

2. The apparatus as set forth in claim 1, further comprising a second diode having a cathode connected to the second terminal of the JFET and an anode connected to the second select line;
    wherein the first terminal of the first diode is a cathode and the second terminal of the first diode is an anode;
    wherein the JFET comprises:
        a first layer comprising n-doped silicon;
        wherein the gate comprises a second layer formed on the first layer, the second layer comprising intrinsic amorphous hydrogenated silicon, a third layer formed on the second layer, the third layer comprising p-doped amorphous hydrogenated silicon, and a conductive layer formed on the third layer; and
        wherein each of the first and second terminals comprises a fourth layer formed on the first layer, the fourth layer comprising n-doped crystalline hydrogenated silicon, and a conductive layer formed on the fourth layer.

3. The apparatus as set forth in claim 2, the first layer having an n-doping concentration of about $3 \times 10^{17}$ cm$^{-3}$ or more and having a thickness in a range of about 20 nm to 55 nm, the second layer having a thickness in a range of about 2 nm to 100 nm, the third layer having a thickness in a range of about 5 nm to 15 nm and a p-doping concentration in a range of about $10^{16}$ cm$^{-3}$ to $10^{21}$ cm$^{-3}$.

4. The apparatus as set forth in claim 2, the second, third, and fourth layers each comprising 5 atomic % hydrogen to 40 atomic % hydrogen.

5. The apparatus as set forth in claim 2, wherein each of the first and second diodes comprises a diode-connected JFET.

6. The apparatus as set forth in claim 1, further comprising a second diode having a cathode connected to the first terminal of the JFET and an anode connected to the read line;
    wherein the first terminal of the first diode is an anode and the second terminal of the first diode is a cathode;
    wherein the JFET comprises:
        a first layer comprising p-doped silicon;
        wherein the gate comprises a second layer formed on the first layer, the second layer comprising intrinsic amorphous hydrogenated silicon, a third layer formed on the second layer, the third layer comprising n-doped amorphous hydrogenated silicon, and a conductive layer formed on the third layer; and
        wherein each of the first and second terminals comprises a fourth layer formed on the first layer, the fourth layer comprising p-doped crystalline hydrogenated silicon, and a conductive layer formed on the fourth layer.

7. The apparatus as set forth in claim 6, the first layer having a p-doping concentration of about $3 \times 10^{17}$ cm$^{-3}$ or more and having a thickness in a range of 20 nm to 55 nm, the second layer having a thickness in a range of 2 nm to 100 nm, the third layer having a thickness in a range of 5 nm to 15 nm and an n-doping concentration in a range of $10^{16}$ cm$^{-3}$ to $10^{21}$ cm$^{-3}$.

8. The apparatus as set forth in claim 6, wherein each of the second, third, and fourth layers comprises 5 atomic % hydrogen to 40 atomic % hydrogen.

9. The apparatus as set forth in claim 1, the JFET having a threshold voltage with magnitude not greater than about 0.5 volt.

10. The apparatus as set forth in claim 1, further comprising a glass screen proximal to the capacitor plate.

11. The apparatus as set forth in claim 10, further comprising a driver circuit configured to drive the first and second select lines with pulse signals.

12. The apparatus as set forth in claim 11, wherein the pulse signals have a peak voltage not greater in magnitude than about 1.0 volt.

13. An apparatus, comprising:
at least first and second select lines;
a read line; and
a pixel circuit, the pixel circuit comprising:
a capacitor plate;
a junction field effect transistor (JFET) including a first terminal coupled to the read line, a second terminal coupled to the second select line, and a gate coupled to the capacitor plate; and
a first diode having a first terminal coupled to the capacitor plate and a second terminal coupled to the first select line;
wherein the capacitor plate is integrated with the gate of the JFET.

14. An apparatus, comprising:
at least first, second and third select lines;
a plurality of read lines;
a first plurality of pixel circuits in one-to-one correspondence with the plurality of read lines, each pixel circuit in the first plurality of pixel circuits comprising: a capacitor plate; a junction field-effect transistor (JFET) including a gate connected directly to the capacitor plate, a first terminal coupled to a corresponding read line, and a second terminal coupled to the second select line; and a first diode including a first terminal connected directly to the capacitor plate and a second terminal coupled to the first select line; and
a second plurality of pixel circuits in one-to-one correspondence with the plurality of read lines, each pixel circuit in the second plurality of pixel circuits comprising: a capacitor plate; a JFET including a gate connected directly to the capacitor plate, a first terminal coupled to a corresponding read line, and a second terminal coupled to the third select line; and a first diode including a first terminal connected directly to the capacitor plate and a second terminal coupled to the second select line.

15. The apparatus as set forth in claim 14, further comprising:
a driver circuit coupled to the first, second and third select lines; and
a finite state machine coupled to the driver circuit, the finite state machine configured to drive the first, second and third select lines sequentially with signal pulses so that no two select lines are driven concurrently.

16. The apparatus as set forth in claim 15, further comprising a plurality of charge integrators in one-to-one correspondence with the plurality of read lines, each of the plurality of charge integrators connected to a corresponding read line.

17. The apparatus as set forth in claim 14,
wherein each pixel circuit in the first plurality of pixel circuits further comprises a second diode including a cathode coupled to the second terminal of the JFET of said each first plurality of pixel circuits and an anode coupled to the second select line;
wherein the first terminal of the first diode in each pixel circuit in the first and second pluralities of pixel circuits is a cathode and the second terminal of the first diode in each pixel circuit in the first and second pluralities of pixel circuits is an anode;
wherein each pixel circuit in the second plurality of pixel circuits further comprises a second diode comprising a cathode coupled to the second terminal of the JFET of said each second plurality of pixel circuits and an anode coupled to the third select line;
wherein each JFET in the first and second pluralities of pixel circuits comprises:
a first layer comprising n-doped silicon;
wherein the gate comprises a second layer formed on the first layer and comprising intrinsic amorphous hydrogenated silicon, a third layer formed on the second layer and comprising p-doped amorphous hydrogenated silicon, and a conductive layer formed on the third layer; and
wherein each of the first and second terminals comprises a fourth layer formed on the first layer and comprising n-doped crystalline hydrogenated silicon, and a conductive layer formed on the fourth layer.

18. The apparatus as set forth in claim 17, wherein each JFET has a threshold voltage with magnitude not greater than about 0.5 volt.

19. The apparatus as set forth in claim 14,
wherein each pixel circuit in the first plurality of pixel circuits further comprises a second diode including a cathode connected to the first terminal of the JFET of said each first plurality of pixel circuits and an anode connected to the corresponding read line;
wherein the first terminal of the first diode in each pixel circuit in the first and second pluralities of pixel circuits is an anode and the second terminal of the first diode in each pixel circuit in the first and second pluralities of pixel circuits is a cathode;
wherein each pixel circuit in the second plurality of pixel circuits further comprises a second diode comprising a cathode connected to the first terminal of the JFET of said each second plurality of pixel circuits and an anode connected to the corresponding read line;
wherein each JFET in the first and second pluralities of pixel circuits comprises:
a first layer comprising p-doped silicon;
wherein the gate comprises a second layer formed on the first layer and comprising intrinsic amorphous hydrogenated silicon, a third layer formed on the second layer and comprising n-doped amorphous hydrogenated silicon, and a conductive layer formed on the third layer; and
wherein each of the first and second terminals comprises a fourth layer formed on the first layer and comprising p-doped crystalline hydrogenated silicon, and a conductive layer formed on the fourth layer.

20. The apparatus as set forth in claim 19, wherein each JFET has a threshold voltage not less than about −0.5 volt.

* * * * *